A. MAZUR.
NUT LOCK.
APPLICATION FILED JULY 23, 1914.

1,121,028.

Patented Dec. 15, 1914.

Witnesses
M. J. Pfeifer
L. E. Barkley

Inventor
Antoni Mazur,
by
Attorney

UNITED STATES PATENT OFFICE.

ANTONI MAZUR, OF NATALIE, PENNSYLVANIA.

NUT-LOCK.

1,121,028.

Specification of Letters Patent. Patented Dec. 15, 1914.

Application filed July 23, 1914. Serial No. 852,769.

*To all whom it may concern:*

Be it known that I, ANTONI MAZUR, a citizen of the United States of America, and resident of Natalie, in the county of Northumberland and State of Pennsylvania, have invented certain new and useful Improvements in Nut-Locks, of which the following is a specification.

This invention relates to nut locks and particularly to novel means for retaining the nut in different positions of adjustment on a bolt, the said invention including novel means for holding the nut retaining member inoperative to facilitate the removal of the nut when properly manipulated.

A further object of this invention is to provide a nut lock in which the nut is provided with the detent or nut arresting or holding member, the said detent being removable to engage the bolt or a shoulder thereof so that rotation of the nut with respect to the bolt is obviated, the said invention furthermore including a detent which will spring into position to engage the bolt and remain in contact with the bolt until manually restrained or operated to bring it into inoperative position.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
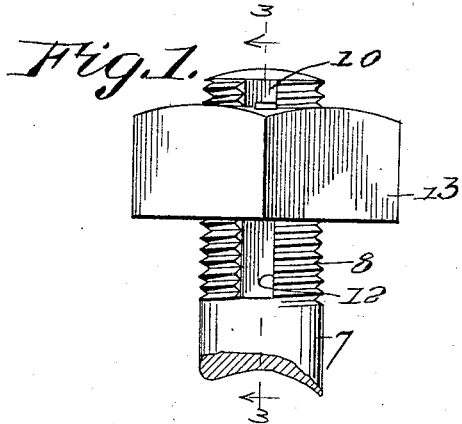
Figure 2:
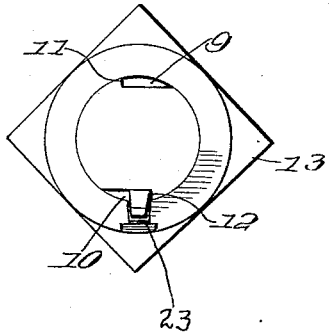
Figure 3:
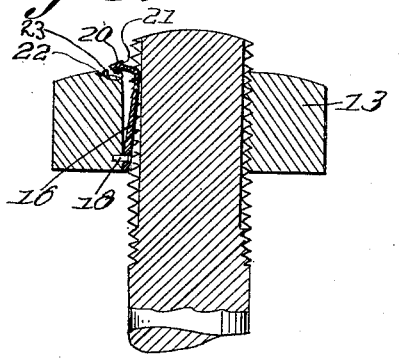
Figure 4:
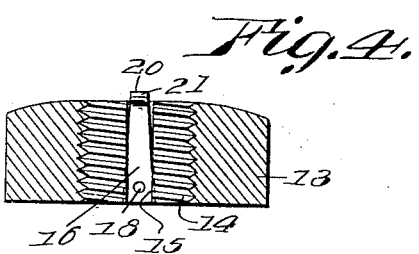
Figure 5:
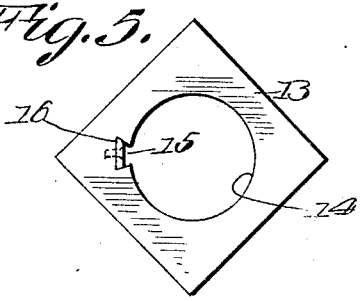
Figure 6:
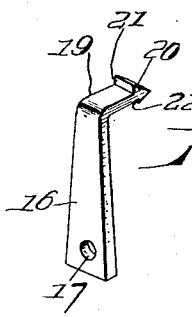

Figure 1 illustrates a view in elevation of a fragment of the bolt with the nut applied thereto; Fig. 2 illustrates a top plan view of the device shown in Fig. 1; Fig. 3 illustrates a sectional view on the line 3—3 of Fig. 1; Fig. 4 illustrates a sectional view through the nut; Fig. 5 illustrates an inner plan view of the nut; and Fig. 6 illustrates a perspective view of the detent.

In these drawings 7 denotes a bolt having threads 8 and longitudinally disposed grooves 9 and 10 forming shoulders 11 and 12 respectively adapted to be abutted by the detent to prevent unscrewing of the nut after it has been applied to the bolt. The manner of forming the slots and the shoulders may be variously modified, the only requirement being that the shoulders shall present engaging surfaces effective to hold the detent against movement rotatively of the bolt.

The nut 13 has the usual opening, the bore 14 of which is threaded and the said nut has a slot or seat 15 extending from the top to the bottom thereof for the reception of the dog or detent 16. The lower part of the dog is apertured as at 17 to receive the fastening 18 which fastener may be a screw, rivet or the like and the upper end of the detent has an angular extension 19 terminating in an arrow head 20, the upper shoulder 21 of which is to be engaged by a tool for manipulating the detent and the lower shoulder 22 of which is to constitute a latch for engaging a shoulder 23 on the upper face of the nut.

The purpose of the inventor is to have the detent 16 so anchored in the seat of the nut that it will automatically spring to the normal position shown in Fig. 3, where the upper end and the intermediate portion of the latch extends into a slot of a bolt, in which position, it would prevent rotation of the nut with respect to the bolt in a direction which would effect the removal of the nut from the bolt. It is apparent from an inspection of Fig. 2 that the faces of the shoulders 11 and 12 are so related to the nut and bolt that the detent abuts the shoulders when the nut is unscrewed, whereas there is no resistance to the turning of the nut when the same is being applied to the bolt.

The normal or operative position of the detent is shown in Fig. 3, as stated, and when it is desired to release the nut so that it may be unscrewed, an operator will so press the head of the detent as to cause the shoulder 22 to engage the shoulder of the nut, which engagement results in latching or retaining the detent so that the nut retaining portion thereof will lie wholly within the seat or recess of the nut, thus freeing the movable parts so that the nut may be taken from the bolt. A slight pressure on the nose or outer end of the arrow head will result in freeing the shoulder 22 from the shoulder of the nut so that the said detent may spring to the operative position shown in Fig. 3.

I claim—

In a nut lock, a bolt having longitudinally disposed shoulders, a nut having a groove, the walls of which are dove-tailed, a shoulder on the outer surface of the nut adjacent the groove thereof, a detent having its lower portion seated in the dove-tailed groove of the nut, said detent having its upper portion bent outwardly and terminating in an arrow head with an upper and lower shoulder, the latter of which is adapted to engage the shoulder of the nut.

In testimony whereof, I affix my signature in the presence of two witnesses.

ANTONI MAZUR.

Witnesses:
D. A. WRAGG,
SAMUEL WRAGG.